US009648510B2

(12) United States Patent
Seo et al.

(10) Patent No.: US 9,648,510 B2
(45) Date of Patent: May 9, 2017

(54) METHOD FOR MEASURING LINK QUALITY IN A WIRELESS COMMUNICATION SYSTEM AND APPARATUS THEREFOR

(75) Inventors: Hanbyul Seo, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 14/345,377

(22) PCT Filed: Sep. 4, 2012

(86) PCT No.: PCT/KR2012/007061
§ 371 (c)(1),
(2), (4) Date: Mar. 17, 2014

(87) PCT Pub. No.: WO2013/042883
PCT Pub. Date: Mar. 28, 2013

(65) Prior Publication Data
US 2014/0341057 A1 Nov. 20, 2014

Related U.S. Application Data

(60) Provisional application No. 61/537,034, filed on Sep. 20, 2011, provisional application No. 61/582,800, (Continued)

(51) Int. Cl.
*H04W 24/10* (2009.01)
*H04J 11/00* (2006.01)
*H04L 5/00* (2006.01)

(52) U.S. Cl.
CPC ......... *H04W 24/10* (2013.01); *H04J 11/0056* (2013.01); *H04L 5/005* (2013.01); *H04L 5/0048* (2013.01); *H04L 5/0007* (2013.01)

(58) Field of Classification Search
CPC . H04W 24/10; H04W 28/18; H04W 36/0083; H04W 68/02; H04W 68/08;
(Continued)

(56) References Cited

U.S. PATENT DOCUMENTS

| 2008/0219370 A1* | 9/2008 | Onggosanusi ....... H04B 7/0417 375/260 |
| 2012/0113844 A1* | 5/2012 | Krishnamurthy ..... H04L 1/0026 370/252 |
| 2012/0155362 A1* | 6/2012 | Montojo ............. H04W 72/082 370/312 |

FOREIGN PATENT DOCUMENTS

| EP | 2645605 | 10/2013 |
| JP | 2012052490 | 3/2012 |

(Continued)

OTHER PUBLICATIONS

TS 36.211 V10.1.0, E-UTRA Physical Channels and Modulation (Release 10), Mar. 2011.*
(Continued)

*Primary Examiner* — Charles C Jiang
*Assistant Examiner* — Oussama Roudani
(74) *Attorney, Agent, or Firm* — Lee Hong Degerman Kang Waimey

(57) ABSTRACT

The present invention relates to a method for reporting the link quality of a downlink by a terminal. Specifically, the method includes the steps of: receiving, from a serving cell, a subframe set for resource-limited measurement and information regarding a cell-specific reference signal of an interference cell; measuring link quality of a downlink in the subframe set; and reporting the measured link quality of the downlink to the serving cell, wherein interference control processing due to the cell-specific reference signal from the
(Continued)

interference cell is applied to the subframe set using the information regarding the cell-specific reference signal of the interference cell.

6 Claims, 11 Drawing Sheets

Related U.S. Application Data filed on Jan. 3, 2012, provisional application No. 61/645,600, filed on May 10, 2012.

(58) Field of Classification Search
CPC ............ H04W 72/0406; H04W 72/082; H04B 7/0626; H04L 5/001; H04L 5/0048
See application file for complete search history.

(56) References Cited

FOREIGN PATENT DOCUMENTS

| KR | 1020090088548 | 8/2009 |
|---|---|---|
| KR | 1020110074499 | 6/2011 |
| WO | 2010/148366 | 12/2010 |
| WO | 2011010863 | 1/2011 |
| WO | 2011/038410 | 3/2011 |
| WO | 2011083794 | 7/2011 |
| WO | 2011/105726 | 9/2011 |

OTHER PUBLICATIONS

LG Electronics, "Consideration on interference measurement for CSI feedback," 3GPP TSG RAN WG1 Meeting #66bis, R1-113190, Oct. 2011, 4 pages.
LG Electronics, "Consideration on interference measurement," 3GPP TSG RAN WG1 Meeting #67, R1-113911, Nov. 2011, 6 pages.
European Patent Office Application Serial No. 12834170.8, Search Report dated Jun. 5, 2015, 10 pages.
Samsung, "Support of time domain ICIC in Rel-10," 3GPP TSG RAN WG1 Meeting #62bis, R1-105406, Oct. 2010, 4 pages.
Hitachi Ltd., "System Design Considerations for CoMP and eICIC," 3GPP TSG-RAN WG1 Meeting #66, R1-112587, Aug. 2011, 7 pages.
PCT International Application No. PCT/KR2012/007061, Written Opinion of the International Searching Authority dated Jan. 22, 2013, 14 pages.
Ericsson, et al., "Enhanced ICIC for co-channel CSG deployments," 3GPP TSG-RAN WG1 #62, R1-104864, 23th-27th 2010, 5 pages.
Ericsson, et al., "On blank MBSFN subframes for eICIC," 3GPP TSG-RAN WG4 Meeting #59AH, R4-113830, Jun. 2011, 3 pages.
LG Electronics, "Details of eICIC in Macro-Pico Case," 3GPP TSG RAN WG1 Meeting #63, R1-106143, Nov. 2010, 5 pages.
Ericsson, et al., "Details of almost blank subframes," 3GPP TSG-RAN WG1 #62bis, R1-105335, Oct. 2010, 6 pages.
NTT Docomo, "Views on eICIC schemes for Rel-10," 3GPP TSG RAN WG1 Meeting #62bis, R1-105442, Oct. 2010, 9 pages.

* cited by examiner

FIG. 2
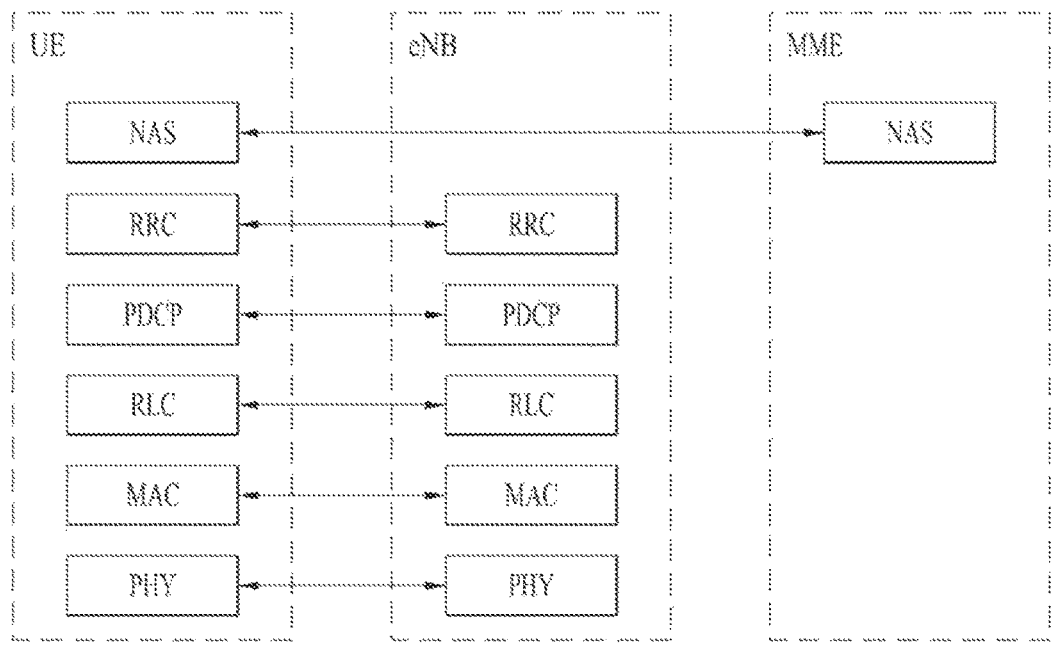
(a) contol - plane protocol stack
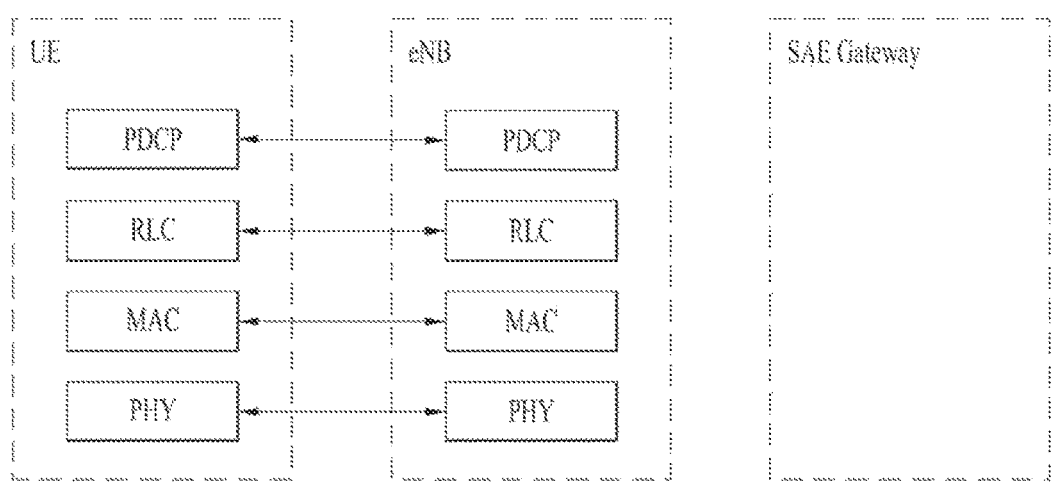
(b) user - plane protocol stack

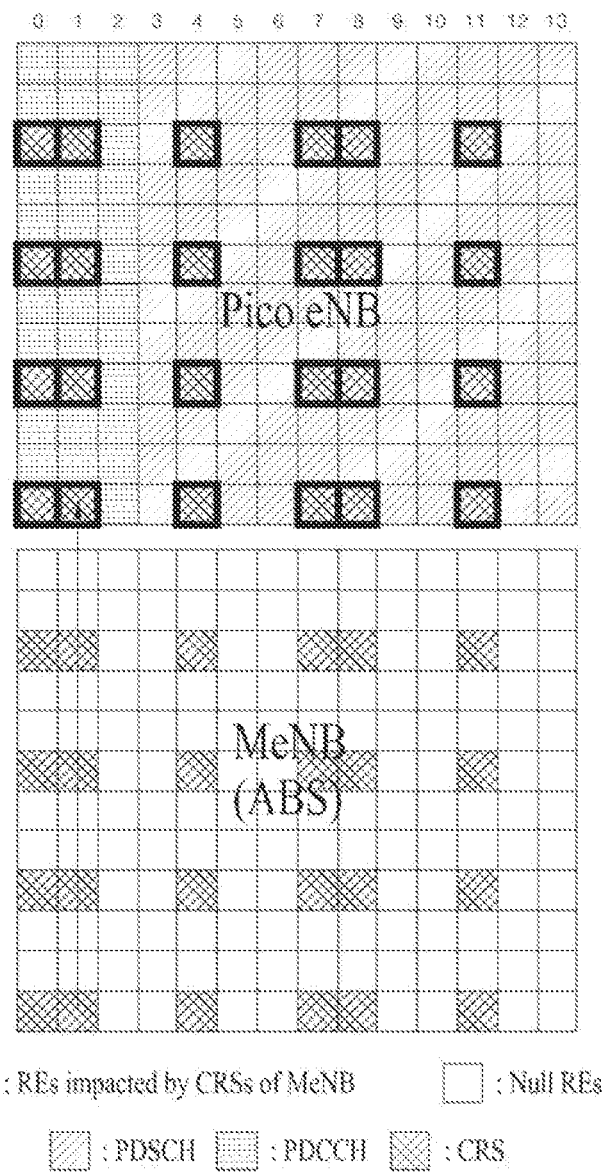

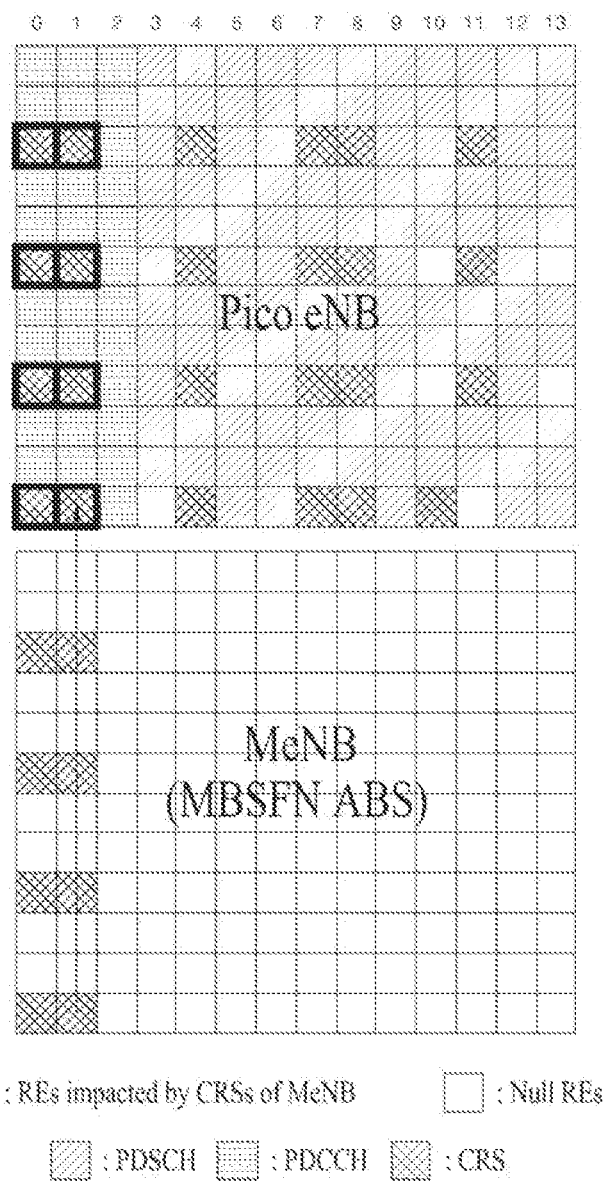

METHOD FOR MEASURING LINK QUALITY IN A WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2012/007061, filed on Sep. 4, 2012, which claims the benefit of U.S. Provisional Application No. 61/537,034, filed on Sep. 20, 2011, 61/582,800, filed on Jan. 3, 2012, and 61/645,600, filed on May 10, 2012, the contents of which are all hereby incorporated by reference herein in their entirety.

TECHNICAL FIELD

The present invention relates to a wireless communication system and, more particularly, to a method for measuring link quality in a wireless communication system, and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DETAILED DESCRIPTION OF THE INVENTION

Technical Problems

Based on the above-described discussion, the present invention is devised to propose a method for measuring link quality in a wireless communication system and an apparatus therefor.

Technical Solutions

According to an aspect of the present invention, provided herein is a method for reporting downlink link quality by a user equipment in a wireless communication system, including receiving information about a subframe set for resource restricted measurement and information about a cell-specific reference signal of an interfering cell from a serving cell; measuring downlink link quality in the subframe set; and reporting the measured downlink link quality to the serving cell, wherein processing for controlling interference caused by the cell-specific reference signal of the interfering cell is applied in the subframe set by using the information about the cell-specific reference signal of the interfering cell.

A subframe included in the subframe set may be an almost blank subframe (ABS) or a multicast broadcast single frequency network ABS. The measuring may include measuring the downlink link quality under the assumption that interference caused by the cell-specific reference signal from the interfering cell has been cancelled.

The downlink link quality may include first information and second information corresponding to the first information and, when the second information is transmitted multiple times between transmission periods of the first information, a subframe for measuring the first information and a subframe for measuring the second information may be assumed as subframes belonging to the subframe set. The first information may be a rank indicator (RI) and the second information may include at least one of a precoding matrix index (PMI) and a channel quality indicator (CQI).

The information about the subframe set may be received through a radio resource control (RRC) layer.

According to another aspect of the present invention, provided herein is a user equipment in a wireless communication system, including a reception module configured to receive information about a subframe set for resource restricted measurement and information about a cell-specific reference signal of an interfering cell from a serving cell; a processor configured to measure downlink link quality in the subframe set; and a transmission module configured to report the measured downlink link quality to the serving cell, wherein the processor applies processing for controlling interference caused by the cell-specific reference signal of the interfering cell in the subframe set by using the information about the cell-specific reference signal of the interfering cell.

Advantageous Effects

According to the embodiments of the present invention, a UE in a wireless communication system can effectively measure link quality and can report the measured link quality to an eNB.

Effects according to the present invention are not limited to what has been particularly described hereinabove and other advantages not described herein will be more clearly understood by persons skilled in the art from the following detailed description of the present invention.

DESCRIPTION OF DRAWINGS

FIG. 2 is a diagram illustrating structures of a control plane and a user plane of a radio interface protocol between a UE and an E-UTRAN based on the 3GPP radio access network specification.

FIG. 7a and FIG. 7b are diagrams explaining the difference in CRS transmission depending upon whether an ABS is configured as an MBSFN subframe.

BEST MODE FOR CARRYING OUT THE INVENTION

Figure 1:
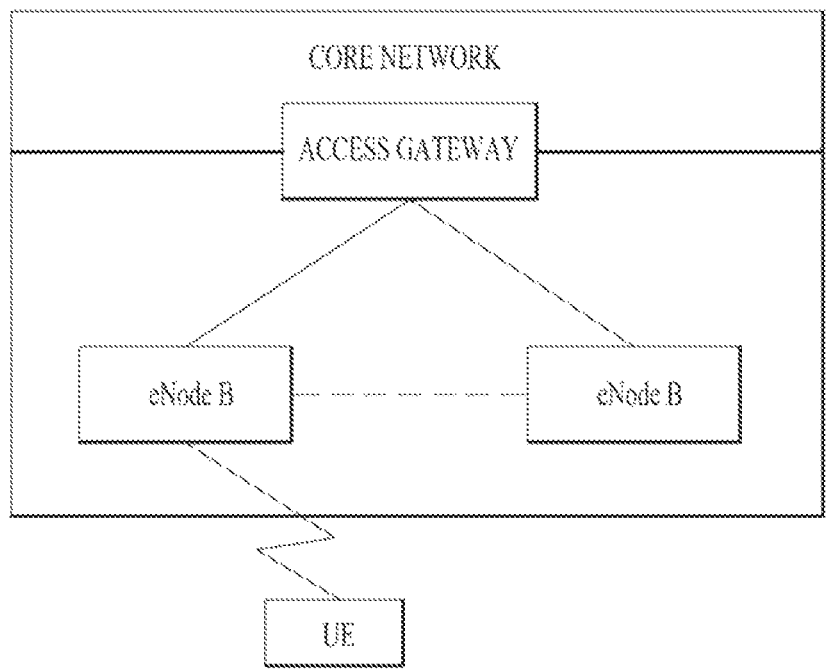
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting an eNB is configured to use one of bandwidths of 1.25, 2.5, 5, 10, and 20 MHz to provide a DL or UL transmission service to a plurality of UEs. Different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
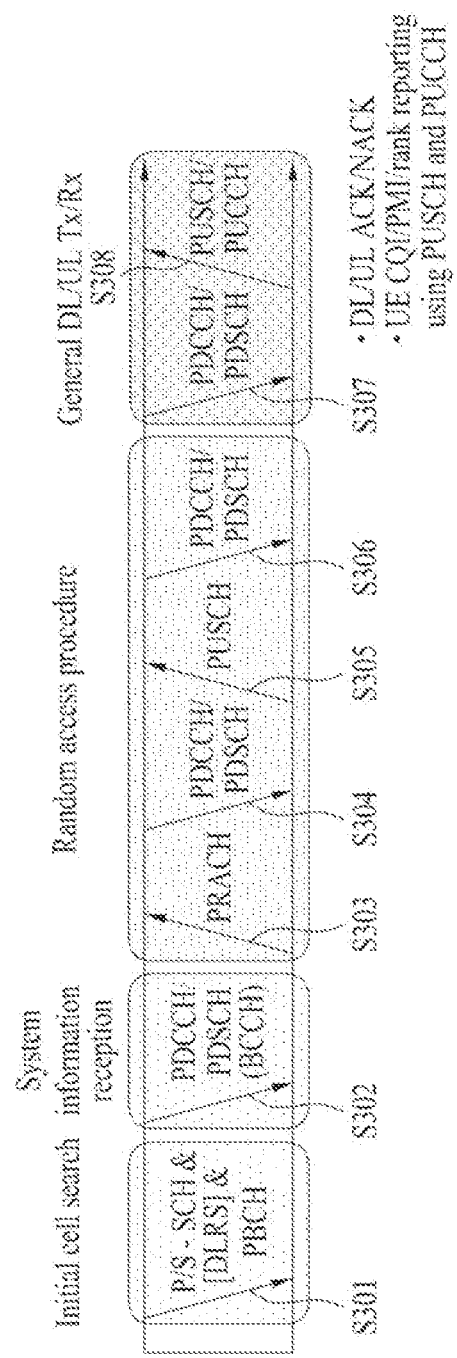
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
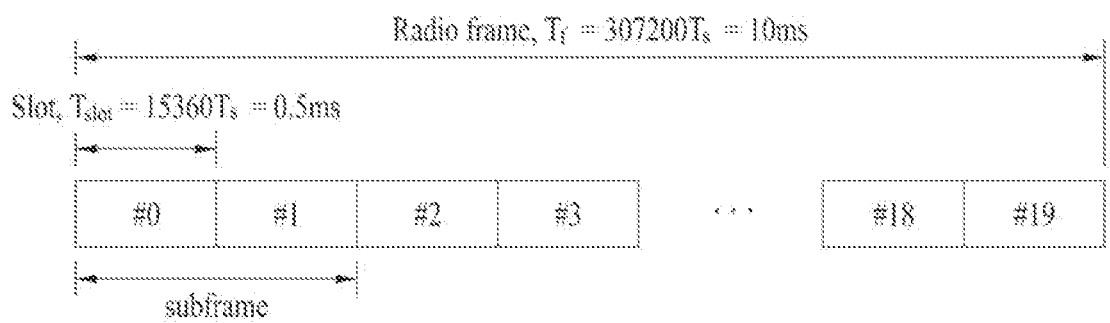
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms ($15360 T_s$). In this case, $T_s$ denotes a sampling time represented by $T_s=1/(15 \text{ kHz} \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
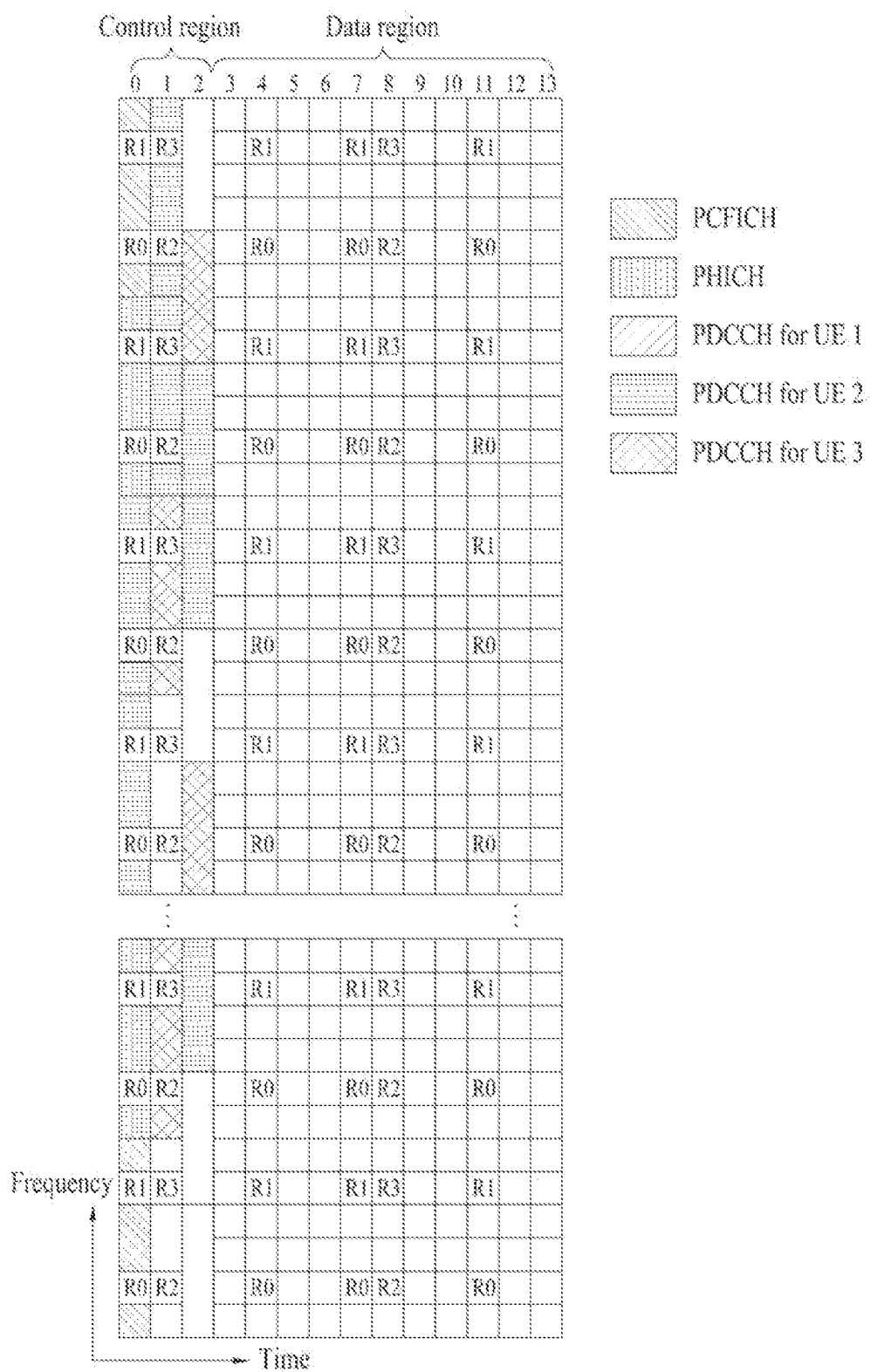
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH using RNTI information thereof. If one or more UEs having RNTI 'A' are present, the UEs receive the PDCCH and receive a PDSCH indicated by 'B' and 'C' based on the received information of the PDCCH.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

Meanwhile, as a method for mitigating inter-cell interference, a currently discussed method is that an interfering cell uses an almost blank subframe (ABS) in which some physical channels are transmitted with reduced transmit power or with no transmit power and an interfered cell schedules a UE in consideration of the ABS.

In this case, in terms of the UE of the interfered cell, an interference level greatly varies with a subframe. In such a situation, in order to perform a more accurate radio link monitoring (RLM) operation, perform a radio resource management (RRM) operation for measuring reference signal received power (RSRP)/reference signal received quality (RSRQ), or measure the above-described CSI for link adaptation in each subframe, subframes in which the RLM/RRM and CSI are measured need to be limited to a subframe set having uniform interference characteristics.

In the current LTE standard, the above discussion is reflected such that a UE is informed of a specific subframe set through higher layer signaling and RLM/RRM and CSI measurement is not performed in subframes which do not belong to the specific subframe set.

The present invention proposes a method in which a UE calculates and then reports CSI or DL quality in a situation in which dominant interference is present. Such a situation occurs when a UE is subject to interference of a greater level than a signal of a serving cell thereof. This will now be described with reference to FIG. 6.

Figure 6:
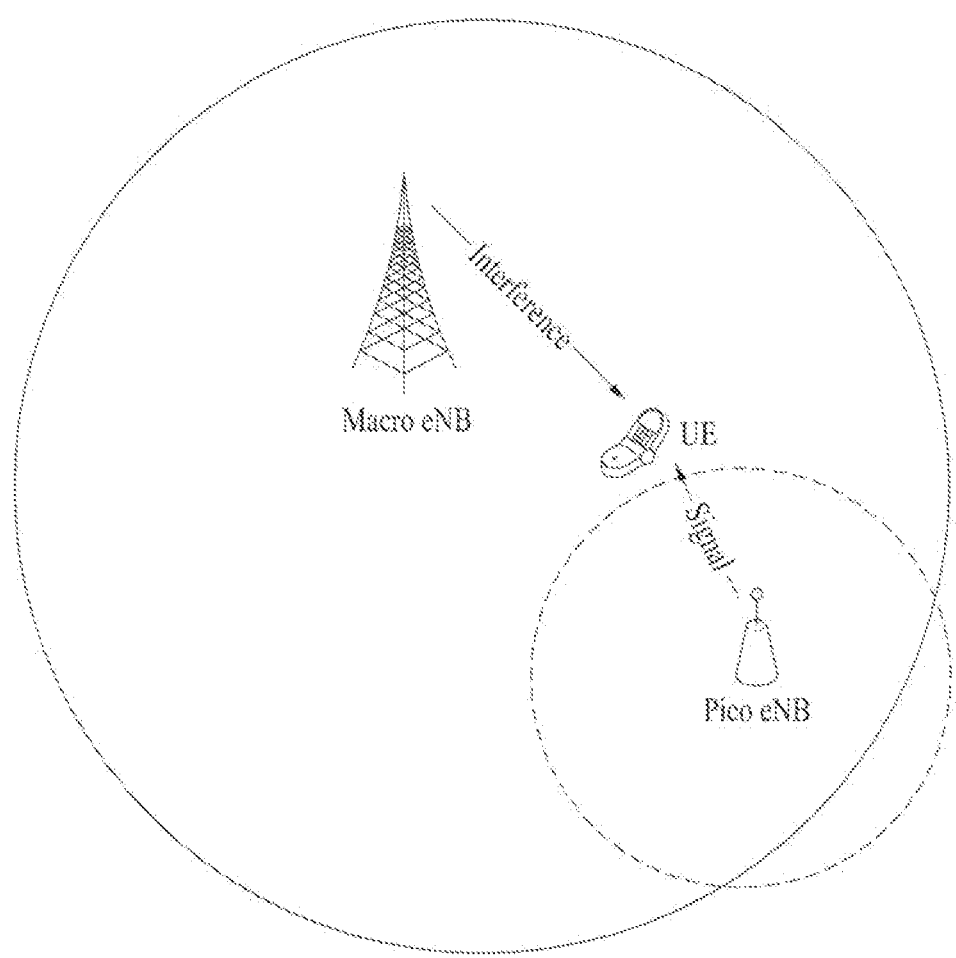
FIG. 6 illustrates a situation in which dominant interference is present.

FIG. 6 illustrates a situation in which dominant interference is present.

As illustrated in FIG. 6, a situation in which a UE experience dominant interference from a macro eNB may occur because the transmit power of a pico eNB is lower than that of the macro eNB although the UE is connected to the pico eNB which is nearest thereto.

For smooth operation of an interfered UE when dominant interference is present, an interference mitigation coordination operation may be performed in which an interfering eNB (macro eNB in the example of FIG. 6) stops transmission (or reduces transmit power) on partial time and/or frequency resources and provides services to the UE on the interference cancelled/reduced resources.

As an example, the macro eNB may configure some subframes as ABSs in which a unicast signal is not transmitted and transmit information about the subframes to the pico eNB so that the pico eNB schedules the UE in the interference reduced subframes.

Thus, if a specific eNB configures partial subframes as ABSs in order to reduce interference with a neighboring eNB, a PDCCH signal for unicast scheduling or a PDSCH signal is desirably not transmitted in subframes configured as ABSs. However, it is desirable to transmit some signals even in the ABS in order to prevent incorrect operation of legacy UEs that do not recognize the presence of the ABS. A representative signal transmitted in an ABS is a cell-specific reference signal (CRS) for performing measurement. However, the CRS transmitted even in the ARS functions as interference with respect to a UE of a neighboring cell, thereby causing performance degradation.

CRS transmission in the ABS depends upon whether the corresponding subframe is configured as a multicast broadcast single frequency network (MBSFN) subframe in an interfering cell. The CRS is not transmitted in a PDSCH region when the subframe is configured as the MBSFN subframe. However, when the subframe is not configured as the MBSFN subframe, the CRS should be transmitted even in the PDSCH region.

FIGS. 7a and 7b are diagrams explaining the difference in CRS transmission depending upon whether an ABS is configured as an MBSFN subframe. Particularly, in FIG. 7a, the ABS is not configured as the MBSFN and it can be appreciated that CRSs are transmitted in a PDSCH region from the macro eNB. In FIG. 7b, however, the ABS is configured as the MBSFN and it can be appreciated that the CRSs are not transmitted in the PDSCH region from the macro eNB.

While it is assumed in FIGS. 7a and 7b that CRSs of the pico eNB and the macro eNB are transmitted on the same subcarriers, the CRSs of the pico eNB and the macro eNB may be transmitted at different locations of subcarriers according to cell ID configuration because a value for frequency shifting of a CRS depends on a cell ID.

To solve CRS interference in the ABS, a UE may perform appropriate processing. A representative example of processing is interference cancellation in which the UE measures a CRS interference channel and restores a desired signal by subtracting estimated interference from a received signal. This scheme has an advantage of completely canceling CRS interference in an ideal case but has a disadvantage in terms of battery consumption because signals of a neighboring cell should always be estimated.

Another example of processing is RE puncturing at a receiver. In this scheme, the UE does not use REs subjected to strong interference from CRSs of a neighboring cell upon performing decoding so as to avoid an influence of CRS interference. In spite of a disadvantage of being incapable of using some REs for decoding, this scheme can be simply achieved relative to the interference cancellation scheme.

The UE performing the above-described processing operation for overcoming CRS interference has a difficulty in guaranteeing communication reliability when an RI/PMI/CQI information calculation method or a link quality calculation method of the UE for CSI feedback is not correctly indicated to an eNB. For example, the above-mentioned processing is desirably performed when there is strong CRS interference from the macro eNB, whereas, it may be more effective not to perform the processing operation when CRS interference is not severe. In other words, the CRS interference processing of the UE is not always performed and is adaptively performed according to an interference situation. However, if the eNB is not aware of whether such processing is applied at a specific time, the eNB cannot accurately judge the impact of processing applied by the UE and thus there is difficulty in correctly selecting a modulation and coding scheme (MCS) level.

More specifically, when interference cancellation is applied, since it is impossible to perfectly cancel interference in reality, a part of CRS interference of a neighboring cell remains even after processing is performed, thereby affecting decoding performance. The impact on decoding performance differs according to the size of a transport block. This is because, if the size of one transport block exceeds a predetermined value, the transport block is split into a plurality of code blocks to be individually decoded and the occupation ratio of CRS interference on specific REs to a specific code block is determined by the size of the transport block. Generally, there is a high probability that substantial CRS interference remains in a specific code block as the size of the transport block increases because resources are allocated by a frequency first mapping scheme of an LTE PDSCH. Although a network needs to be aware of the fact that interference cancellation is applied, proper link adaptation may be performed by estimating the impact of CRS interference in the size of the allocated transport block.

Figure 8:
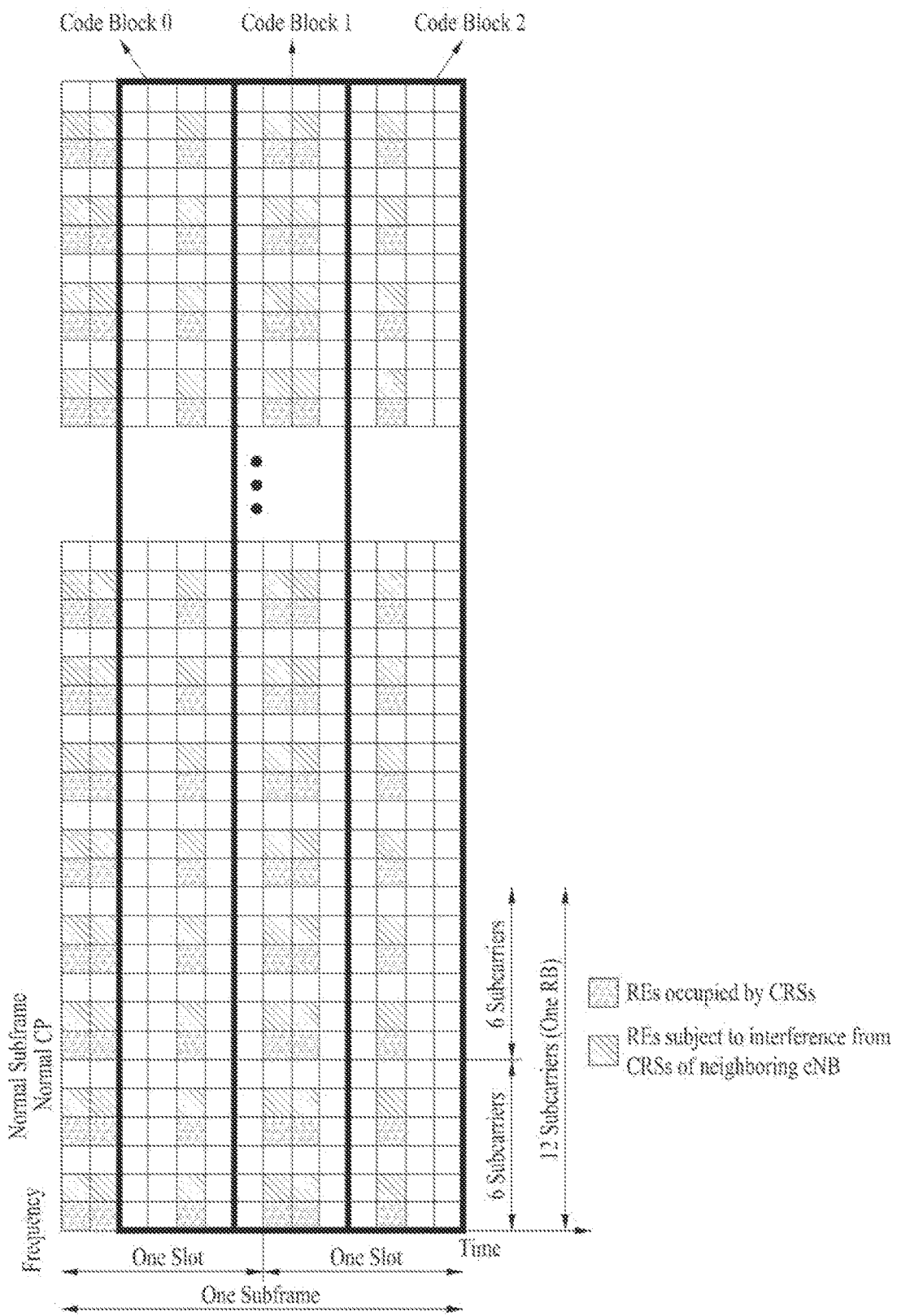
FIG. 8 illustrates an example of comparing the impact of inter-cell interference on each code block when one transport block is split into a plurality of code blocks.

FIG. 8 illustrates an example of comparing the impact of inter-cell interference on each code block when one transport block is split into a plurality of code blocks.

Referring to FIG. 8, all allocated resources are split into three code blocks but code block 1 experiences twice as much CRS interference as the other code blocks. Therefore, even after interference cancellation is performed, decoding performance of this specific code block 1 is further degraded due to remaining CRS interference. Obviously, this phenomenon does not appear when there is a small number of allocated RBs so that only one code block is present on all resources. Similarly, since the number of REs punctured in a specific code block is determined by the size of a transport block even during RE puncturing of a receiver, it is necessary to discern which processing is operated in order for a network to perform a link adaptation process. To solve such a problem, the present invention proposes a method in which a UE measures CSI or link quality.

Figure 9:
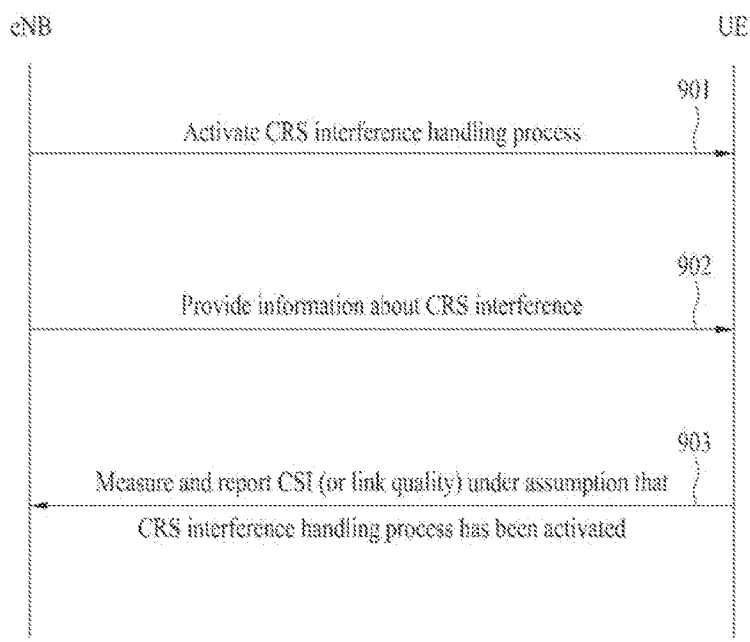
FIG. 9 is a diagram illustrating a CSI calculation method of a UE according to an embodiment of the present invention.

FIG. 9 is a diagram illustrating a method in which a UE measures CSI or link quality according to an embodiment of the present invention.

First, a network may transmit a signal indicating whether to operate a process for handling CRS interference of a neighboring cell to a UE as shown in step 901. For instance, an eNB may command the UE to measure and report CSI or link quality, through higher layer signaling such as RRC signaling, under the assumption that the CRS interference handling process has been activated as shown in step 903. Similarly, the eNB may command the UE to start to measure the CSI or link quality without such a process.

Particularly, such an indication message may include information about CRS interference of the neighboring cell. Alternatively, the information about CRS interference may be provided as shown in step 902 separately from the indication message. The information about CRS interference may include an ID of the neighboring cell, the number of antenna ports of the neighboring cell, a time/frequency offset value of a CRS RE, and MBSFN subframe configuration information of the neighboring cell.

Additionally, the eNB may inform the UE that the CSI or link quality is to be measured under a certain assumption about a processing type (i.e. assumption as to whether used processing is interference cancellation, receiver RE puncturing, or additional processing). Alternatively, the UE may report, to the eNB, which type of processing is assumed to measure the CSI or link quality.

In the case of aperiodic CSI reporting triggered by a PDCCH, an indicator indicating whether it is assumed that an MBSFN subframe of a specific cell in a triggering PDCCH is configured may be added.

As a method for indicating an assumption about the CRS interference handling process during CSI or link quality measurement, a restricted measurement message may be used as an implicit indicator. As described above, since the eNB configures resource restricted measurement for correct CSI or link quality measurement in a dominant interference environment, the UE having CRS interference handling capability may interpret such a resource restricted measurement configuration as a signal for activating the CRS interference handling process and apply the process included therein during PDSCH/PDCCH demodulation or CSI or link quality measurement result feedback. In other words, if a subframe set for resource restricted measurement is configured, the UE may activate the above-described CRS interference handling process upon measuring CSI or link quality for each subframe set.

Even in this case, the eNB may transmit information about CRS interference to the UE or the UE reports information about CRS interference handled thereby to the eNB. Alternatively, without exchanging such information, the UE may be operated to report a result of measuring CSI or link quality achievable after interference handling under the assumption that CRS interference of a uniform characteristic is always present (e.g. under the assumption that CRS interference corresponding to the number of specific antenna ports is present at a specific location).

While the CSI or link quality measurement result based on such UE processing is fed back, the MBSFN subframe configuration of an interfering cell affects UE feedback as illustrated in FIGS. 7a and 7b. Since CRS interference is present even in a PDSCH region of an ABS not configured as an MBSFN (hereinafter, referred to as a normal ABS) of a neighboring cell, the CSI or link quality measurement result after interference processing should be reported. On the other hand, since CRS interference is not present in a PDSCH region of an ABS configured as an MBSFN (hereinafter, referred to as an MBSFN ABS) of the neighboring cell, it is proper to report the CSI or link quality measurement result calculated without additional CRS interference processing. In an actual network operation situation, the normal ABS and the MBSFN ABS may be mixed and thus it is desirable to report an accurate CSI or link quality measurement result by appropriately processing the normal ABS and the MBSFN ABS.

As one method to this end, the present invention proposes that a normal ABS and an MBSFN ABS be not included in the same subframe set. That is, if specific subframes constitute one subframe set, all MBSFN subframes of an interfering cell in the specific subframes are identically configured. Then, the UE may measure CSI or link quality under the assumption that the same CRS interference handling process is performed in the same subframe set. For example, during PDSCH decoding, the eNB may indicate a subframe set in which CRS interference is present and a subframe set in which CRS interference is not present, through a higher-layer signal such as an RRC signal.

Alternatively, the UE may monitor presence/absence of CRSs of a neighboring cell and measure CSI or link quality under the assumption of the CRS interference handling process in a specific subframe set. In this case, a network preferably appropriately controls an MBSFN subframe configuration so that the UE may assume that the same CRS interference characteristic is maintained in the same subframe set.

As another method, the present invention proposes that CSI or link quality measurement be performed by applying a specific assumption of the UE about CRS interference to all subframes in a specific subframe set in a situation in which a normal ABS and an MBSFN ABS coexist in the same subframe set. For instance, when the UE measures the CSI or link quality under the assumption CRS interference is solved through one of interference cancellation or receiver RE puncturing, the UE reports a CSI or link quality measurement result achievable under the above assumption regardless of whether CRS interference is actually present in all subframes in the specific subframe set. In addition, assuming that CRS interference is present, the UE may be operated to measure CSI or link quality under the assumption that CRS interference is present irrespective of whether CRS interference has actually been monitored in the same subframe set.

Especially, such an operation suits periodic CSI reporting. In the case of periodic CSI reporting, an RI is determined based on one subframe as a reference resource and then a PMI/CQI is determined based on another subframe as the reference resource. Here, even when presence/absence of CRS interference on the reference resource during RI determination is not equal to presence/absence of CRS interference on the reference resource during PMI/CQI determination, consistent CSI measurement can be performed. A reverse operation may also be performed. That is, the UE may calculate CSI under the assumption that CRS interference is always absent irrespective of whether CRS interference is actually monitored in subframes and report the calculated CSI.

Additionally, CSI (or link quality measurement result) calculated according to whether CRS interference is present or absent when the normal ABS and the MBSFN ABS coexist in the same subframe set may be separately fed back. In other words, CSI (or link quality measurement result) measured under the assumption that CRS interference is present and CSI (or link quality measurement result) measured under the assumption that CRS interference is absent are separately fed back so as to cause the network to provide information to be used in a corresponding subframe.

Alternatively, to maintain consistency between RI reporting and PMI/CQI reporting, the UE may be operated to perform PMI/CQI reporting under the assumption that the same CRS interference as on a reference resource during RI reporting corresponding to specific PMI/CQI reporting is present (and under the assumption that proper processing for handing the CRS interference is performed).

Figure 10:
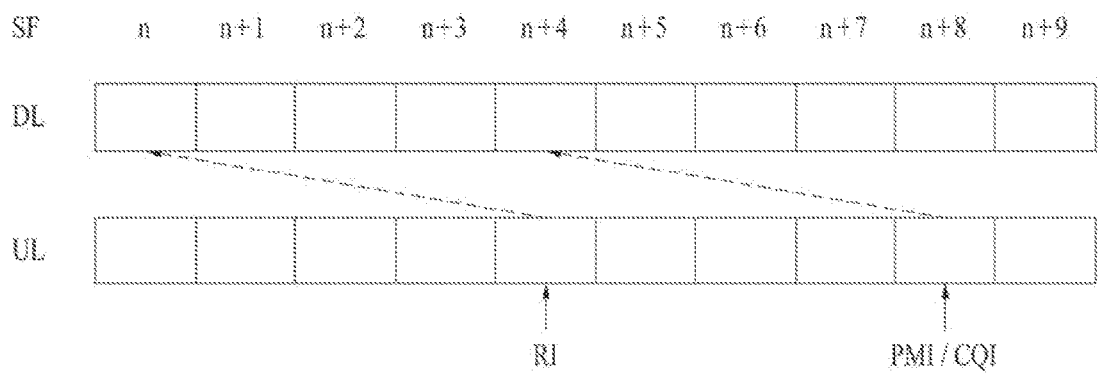
FIG. 10 illustrates an example of configuring a reference resource for PMI/CQI reporting to maintain consistency between RI reporting and PMI/CQI reporting according to an embodiment of the present invention.

FIG. 10 illustrates an example of configuring a reference resource for PMI/CQI reporting to maintain consistency between RI reporting and PMI/CQI reporting according to an embodiment of the present invention.

Referring to FIG. 10, an RI reported in subframe (SF) #n+4 and PMI/CQI reported in SF #n+8 configure SF #n and SF #n+4 as reference resources, respectively.

According to the present invention, if CRS interference is not present because SF #n is an MBSFN ABS, the UE calculates the PMI/CQI under the assumption that CRS interference is not present irrespective of an MBSFN subframe configuration of an interfering cell in SF #n+4 and reports the calculated PMI/CQI in SF #n+8. If CRS interference is present because SF #n is a normal ABS, the UE calculates the PMI/CQI under the assumption that CRS interference is present irrespective of the MBSFN subframe configuration of the interfering cell in SF #n+4 and reports the calculated PMI/CQI in SF #n+8. In other words, it is assumed that the MBSFN subframe configuration of the interfering cell on a reference resource of CSI reporting is the same as configuration of a subframe used as a reference resource during RI reporting assumed in corresponding CSI reporting.

In particular, such an operation is effective during CSI reporting associated with an intermittently transmitted CSI-RS for channel estimation of a serving cell. For example, if there are a plurality of periodic CSI reporting instances that a CSI-RS transmission occurs once and the RI and the PMI/CQI are reported before a next CSI-RS transmission, the UE may assume that a serving cell channel is invariant between the CSI reporting instances. Therefore, there is an advantage in that the PMI/CQI obtained during RI calculation can be reported without the need of calculating the PMI/CQI again. Such a scheme may be slightly changed so that the UE may assume that reference resources of all CSI reporting instances appearing until a CSI-RS is transmitted after the CSI-RS is transmitted once have the same MBSFN subframe configuration as an MBSFN subframe configuration of a reference resource of the first instance.

Assumption that the same reference resource configuration as a reference resource configuration during RI reporting is used during PMI/CQI calculation to be reported may be commonly applied not only to an MBSFN subframe of an interfering cell but also to factors affecting PMI/CQI calculation (e.g. the number of REs for an RS, the number of available OFDM symbols, and the number of REs).

The present invention also proposes an operation of calculating an additional CSI value according to the size of a transport block (or codewords) (or the number of RBs allocated to determine the size of a transport size) and reporting the CSI value. As described above, when an operation such as interference cancellation or receiver RE puncturing is performed, an impact of CRS interference remaining after the operation varies with the size of a transport block even in the same SNR environment. To solve this, according to the present invention, it is proposed that the network inform the UE of information such as the size of a transport block or the number of allocated REs assumed in CSI calculation, through a higher-layer signal such as an RRC signal or through an L1/L2 control signal.

Alternatively, the UE may report a plurality of CSI values calculated with respect to a plurality of RBs. For example, in the case of periodic CSI reporting, the UE may be operated to feed back CSI for a small number of allocated RBs (e.g. 4 RBs) once and feed back CSI for a large number of allocated RBs (e.g. all RBs) next time.

The operation proposed in the present invention, in which the UE measures CSI or link quality by applying a specific assumption about CRS interference to all subframes in a specific subframe set when the normal ABS and the MBSFN ABS are included in the same subframe set, may be importantly applied when an interfering cell performs reduced non-zero power PDSCH transmission (hereinafter, referred to as NZP-ABS operation) rather than zero power PDSCH transmission (hereinafter, referred to as ZP-ABS operation) in an ABS.

Referring to back to the example of FIG. 7, if the macro eNB operates the NZP-ABS in the case in which the CRSs of the macro eNB collide with the CRSs of the pico eNB, a pico UE has difficulty in measuring interference. For instance, when an additional interference measurement resource is not configured, the pico UE cancels the CRSs of the eNB and measures interference under the assumption that signals monitored in the CRS-cancelled positions are interference signals. However, when the macro eNB operates the normal ABS in the case where the CRSs of the pico eNB collide with those of the macro eNB as illustrated in FIG. 7, the CRSs of the macro eNB are included in interference measurement so that interference is not measured in an ABS situation but rather interference similar to interference in a non-ABS situation may be measured.

If the pico UE has capabilities of cancelling the CRSs of the macro eNB, the pico UE may cancel the CRSs of the macro eNB and measure interference. However, even in this case, if the macro eNB operates the NZP-ABS, since interference measured by the pico UE after the CRSs of the macro eNB are cancelled does not include an actual PDSCH power of the macro eNB (although greater than 0 due to the NZP-ABS, the power is significantly reduced as compared to a non-ABS), incorrect measurement is still performed.

Meanwhile, if the macro eNB operates the MBSFN ABS, since the CRSs of the pico eNB do not collide with the CRSs of the macro eNB in a PDSCH region, interference from the macro eNB can be directly measured after only the CRSs of the pico eNB are cancelled. Accordingly, to solve an interference measurement error between the normal ABS (i.e. a non-MBSFN ABS) and the MBSFN ABS, interference may be measured and CSI or link quality may be measured, under the above-described assumption that all subframes belonging to a specific subframe set are non-MBSFN (or MBSFN) ABSs.

Additionally, when the macro eNB operates the NZP-ABS, an "RS-to-PDSCH transmission power ratio" of the macro eNB may be transmitted to the pico UE so as to measure interference in the normal ABS (especially when the CRSs of the macro eNB collide with the CRSs of the pico eNB). Then, the pico UE may estimate the amount of interference in the NZP-ABS of the macro eNB based on the transmitted transmission power ratio after measuring the CRSs of the macro eNB. After cancelling both the CRSs of the pico eNB and the CRSs of the macro eNB, the pico UE may calculate interference in the NZP-ABS by adding the amount of interference estimated from the macro eNB to the measured interference and measure CSI or link quality based on the calculated interference. This operation may be performed based on the CRSs of the macro eNB transmitted in both a PDCCH region and a PDCCH region in the normal ABS. On the other hand, if the CRSs of the pico eNB are cancelled from the PDSCH region in the MBSFN ABS as described above, interference in the NZP-ABS of the macro eNB may directly be measured.

Generally, the interference of the macro eNB directly measured in the MBSFN ABS is different from interference estimated by the pico UE in the normal ABS due to traffic load or beamforming operation of the macro eNB and thus inconsistency of interference measurement between the normal ABS and the MBSFN ABS occurs again. Even in this case, such a problem can be resolved by applying a proper assumption about the presence of CRS interference proposed in the present invention.

As an example, even when a specific subframe is an MBSFN ABS and the pico UE can directly measure interference of a macro eNB in a PDSCH region, if the "RS-to-PDSCH transmission power ratio" of the macro eNB has been transmitted for interference measurement in a normal ABS, an operation for inducing an interference estimate in the normal ABS under the assumption that a corresponding subframe is a non-MBSFN ABS, i.e. an operation of calculating an interference estimate from the macro eNB using a measurement value of the CRSs of the macro eNB and information about the transmitted power ratio under the assumption that the CRSs of the macro eNB are present, may be performed and CSI or link quality may be measured based on such an operation, thereby solving the above-described interference measurement inconsistency problems.

In performing this operation, since the macro eNB does not transmit CRSs in the PDSCH region of the MBSFN ABS, the pico UE may measure the CRSs transmitted by the macro eNB in the PDCCH region and perform the above operation under the assumption that the macro eNB transmits CRSs of the same signal size even in the PDSCH region based on the calculated CRSs (and under the assumption that a PDSCH is transmitted according to the transmitted "RS-to-PDSCH transmission power ratio").

As another example, the UE may be operated to measure CSI or link quality by regarding only interference measured in the MBSFN ABS (more specifically, measured in the PDSCH region of the MBSFN ABS without CRSs of the macro eNB) as effective. Particularly, this means that, although the normal ABS is configured as the reference resource of the CSI, the pico UE may calculate the CSI based on interference measured in a subframe other than the reference resource, more specifically, measured in an MBSFN ABS belonging to the same CSI subframe set as the reference resource. In addition, to select one of two measurement schemes as necessary, the eNB may indicate which assumption is used to measure CSI or link quality in a specific subframe set through a higher-layer signal such as an RRC signal.

The above-described operation may be applied even to the case in which interference is measured in a non-ABS. As an example, when the pico UE measures interference in a non-ABS in the case in which the CRSs of the macro eNB collide with the CRSs of the pico eNB, since the pico UE may measure interference after cancelling only the CRSs of the pico eNB in a normal ABS, interference corresponding to the CRSs of the macro eNB is measured. On the other hand, in an MBSFN ABS, interference corresponding to the PDSCH of the macro eNB is measured. Hence, inconsistency occurs in measured interference. To cancel such inconsistency, a proper assumption about whether the CRSs of the macro eNB are transmitted may be introduced.

For example, the UE may measure CSI or link quality by regarding the CRSs of the macro eNB as interference from the macro eNB after cancelling only the CRSs of the pico eNB as in the normal ABS under the assumption that the macro eNB transmits CRSs in the PDSCH region even in the MBSFN ABS. As in the above description, since the CRSs of the macro eNB are not actually present in the PDSCH region of the MBSFN ABS, the CRS measurement values of the macro eNB in a PDCCH region may replace those in the PDSCH region.

As still another example, since the pico UE is actually subject to much interference from the PDSCH of the macro eNB in the non-ABS, the pico UE may be operated to measure CSI or link quality by regarding only interference measured in the MBSFN ABS (more specifically, measured in the PDSCH region of the MBSFN ABS in which the CRSs of the macro eNB are not present) as effective. Especially, this means that, although the normal ABS is configured as the reference resource of the CSI, the pico UE may measure the CSI or link quality based on interference measured in a subframe other than the reference resource, more specifically, measured in an MBSFN ABS belonging to the same subframe set as the reference resource.

Figure 11:
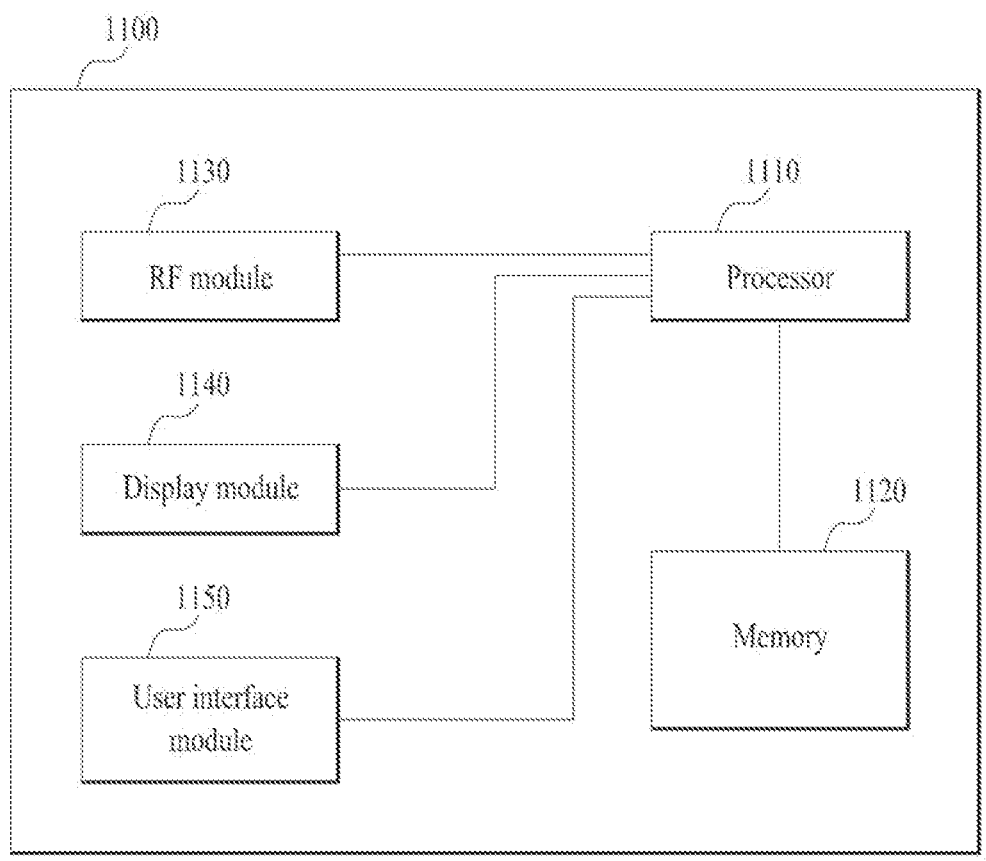
FIG. 11 is a block diagram of a communication apparatus according to an embodiment of the present invention.

FIG. 11 is a block diagram of a communication apparatus according to an embodiment of the present invention.

Referring to FIG. 11, a communication device 1100 includes a processor 1110, a memory 1120, a radio frequency (RF) module 1130, a display module 1140, and a user interface module 1150.

The communication device 1100 is illustrated for convenience of description and some modules may be omitted. The communication device 1100 may further include necessary modules. Some modules of the communication device 1100 may be further divided into sub-modules. The processor 1100 is configured to perform operations according to the embodiments of the present invention exemplarily described with reference to the drawings. Specifically, for a detailed description of operations of the processor 2100, reference may be made to the statements described with reference to FIGS. 1 to 10.

The memory 1120 is connected to the processor 1110 and stores operating systems, applications, program code, data, and the like. The RF module 1130 is connected to the processor 1110 and performs a function of converting a baseband signal into a radio signal or converting a radio signal into a baseband signal. For this, the RF module 1130 performs analog conversion, amplification, filtering, and frequency upconversion or performs inverse processes thereof. The display module 1140 is connected to the processor 1110 and displays various types of information. The display module 1140 may include, but is not limited to, a well-known element such as a liquid crystal display (LCD), a light emitting diode (LED), or an organic light emitting diode (OLED). The user interface module 1150 is connected to the processor 1110 and may include a combination of well-known user interfaces such as a keypad and a touchscreen.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent on each other may of course be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the method and apparatus for measuring link quality in a wireless communication system have been described in the context of a 3GPP LTE system, the present invention is also applicable to many other wireless communication systems in addition to the 3GPP LTE system.

The invention claimed is:

1. A method for performing a measurement by a user equipment in a wireless communication system, the method comprising:
    receiving, via a higher layer, information about one or more subframe sets related to a neighbor cell and configuration information about a cell-specific reference signal of the neighbor cell;
    performing a resource restricted measurement on subframes which are indicated by the information about the one or more subframe sets related to the neighbor cell;
    performing a resource unrestricted measurement on subframes which are not indicated by the information about the one or more subframe sets related to the neighbor cell; and
    transmitting a result of the resource restricted measurement and a result of the resource unrestricted measurement,
    wherein the resource restricted measurement is based on the configuration information about the cell-specific reference signal of the neighbor cell and includes mitigating an interference occurred by the cell-specific reference signal of the neighbor cell on the subframes which are indicated by the information about the one or more subframe sets related to the neighbor cell, and
    wherein the resource unrestricted measurement is performed without mitigating any interference occurred by the cell-specific reference signal of the neighbor cell on the subframes which are not indicated by the information about the one or more subframe sets related to the neighbor cell.

2. The method according to claim 1, wherein the subframes indicated by the information about the one or more subframe sets related to the neighbor cell are almost blank subframes (ABSs) or multicast broadcast single frequency network (MBSFN) ABSs.

3. The method according to claim 1, wherein the higher layer is a radio resource control (RRC) layer.

4. A user equipment in a wireless communication system, the user equipment comprising:
- a receiver configured to receive, via a higher layer, information about one or more subframe sets related to a neighbor cell and configuration information about a cell-specific reference signal of the neighbor cell;
- a processor configured to perform a resource restricted measurement on the subframes which are indicated by the information about the one or more subframe sets related to the neighbor cell and perform a resource unrestricted measurement on subframes which are not indicated by the information about the one or more subframe sets related to the neighbor cell; and
- a transmitter configured to report a result of the resource restricted measurement and a result of the resource unrestricted measurement,
- wherein the resource restricted measurement is based on the configuration information about the cell-specific reference signal of the neighbor cell and includes mitigating an interference occurred by the cell-specific reference signal of the neighbor cell on the subframes which are indicated by the information about the one or more subframe sets related to the neighbor cell, and
- wherein the resource unrestricted measurement is performed without mitigating any interference occurred by the cell-specific reference signal of the neighbor cell on the subframes which are not indicated by the information about the one or more subframe sets related to the neighbor cell.

5. The user equipment according to claim 4, wherein the subframes indicated by the information about the one or more subframe sets related to the neighbor cell are almost blank subframes (ABSs) or multicast broadcast single frequency network (MBSFN) ABSs.

6. The user equipment according to claim 4, wherein the higher layer is a radio resource control (RRC) layer.

* * * * *